June 20, 1939.  P. CAMERON  2,163,481
AIRCRAFT HAVING ROTATIVE SUSTAINING MEANS
Filed Dec. 24, 1936  6 Sheets-Sheet 2

P. Cameron, Inventor
By: Glascock Downing & Seebold
Attys.

June 20, 1939.  P. CAMERON  2,163,481
AIRCRAFT HAVING ROTATIVE SUSTAINING MEANS
Filed Dec. 24, 1936  6 Sheets-Sheet 4

P. Cameron
Inventor

By: Glascock Downing & Seebold
Attys.

June 20, 1939.  P. CAMERON  2,163,481
AIRCRAFT HAVING ROTATIVE SUSTAINING MEANS
Filed Dec. 24, 1936  6 Sheets-Sheet 5
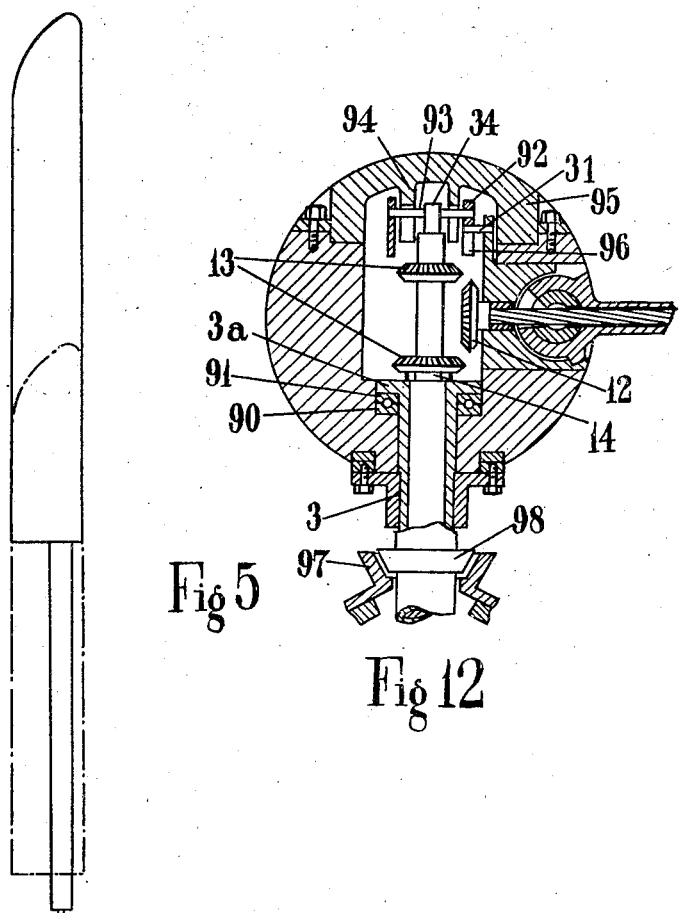
Fig 5
Fig 12
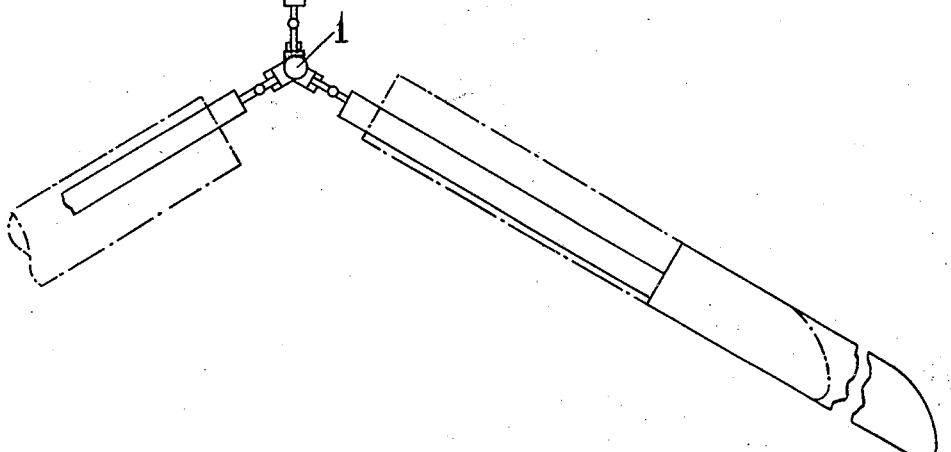
P. Cameron
INVENTOR
By: Glascock Downing & Seebold
Attys.

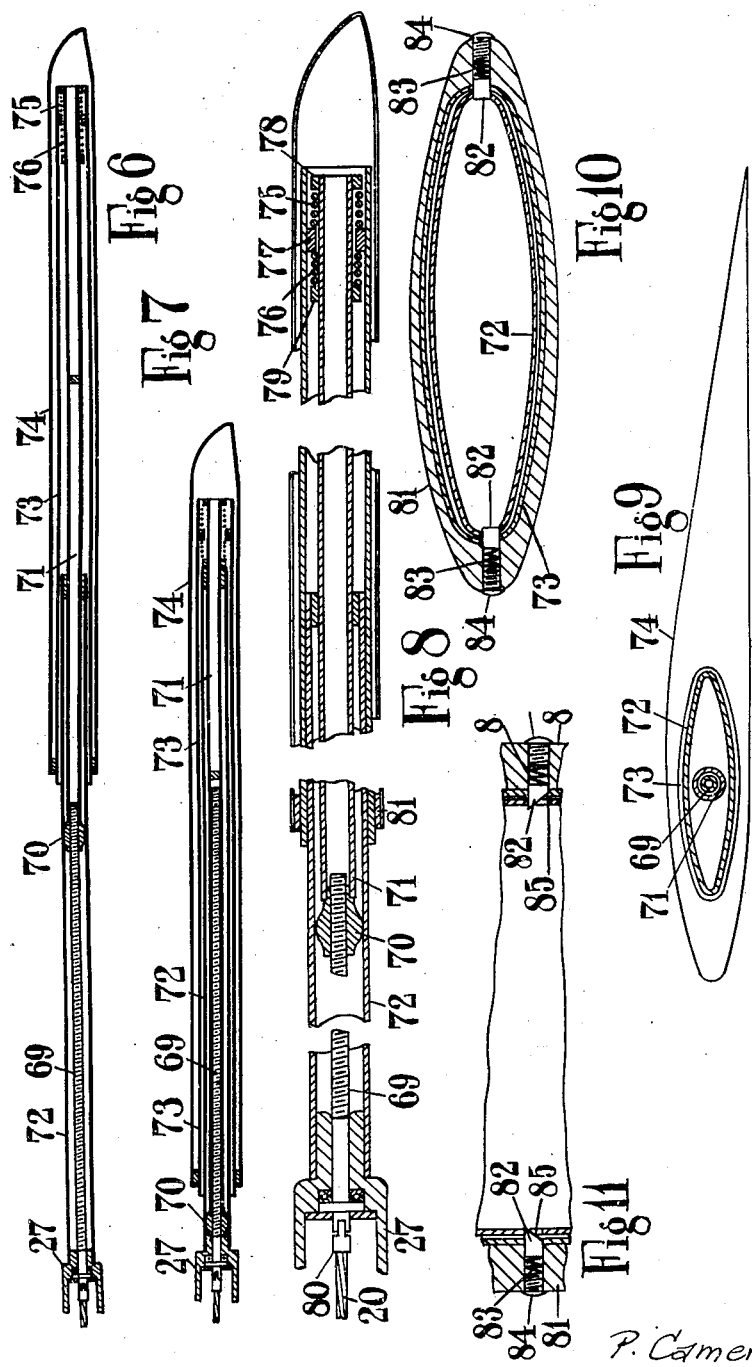

Patented June 20, 1939

2,163,481

UNITED STATES PATENT OFFICE 2,163,481

AIRCRAFT HAVING ROTATIVE SUSTAINING MEANS

Peter Cameron, Kelvinside, Glasgow, Scotland

Application December 24, 1936, Serial No. 117,626
In Great Britain January 1, 1936

10 Claims. (Cl. 244—17)

This invention relates to aircraft having rotative sustaining-means and more particularly to the rotor head to which are secured the blades forming such sustaining-means.

The rotor head of a machine of this type is generally provided with a universal coupling or the like whereby it can partake of a limited universal motion relatively to the flying machine on which it is mounted. In driving such rotor head it is not an easy matter mechanically to arrange that all the parts should have this universal motion without a great deal of complication, and it is the object of the present invention to devise a simpler and improved rotor head whereby various advantages are obtained as hereinafter set forth.

On the annexed sheets of drawings:

Figure 5 is a plan view of the rotor head complete with the rotor blades, two of the blades being shown broken away.

Figure 6 is a sectional elevation of a rotor blade and its support, the blade being shown in its extended position.

Figure 7 is a view similar to Figure 6, but showing the blade in a retracted position.

Figure 8 is a view similar to Figure 7 to a larger scale, part of the blade and its support being shown broken away.

Figure 9 is a transverse cross sectional elevation of a rotor blade and its support.

Figure 10 is a section through a collar carried by the blade and having means by which the blade is locked against further extension.

Figure 11 is a sectional plan view of Figure 10, and

Figure 12 is a sectional elevation of a modified construction of rotor head in accordance with the invention.

Figure 1:
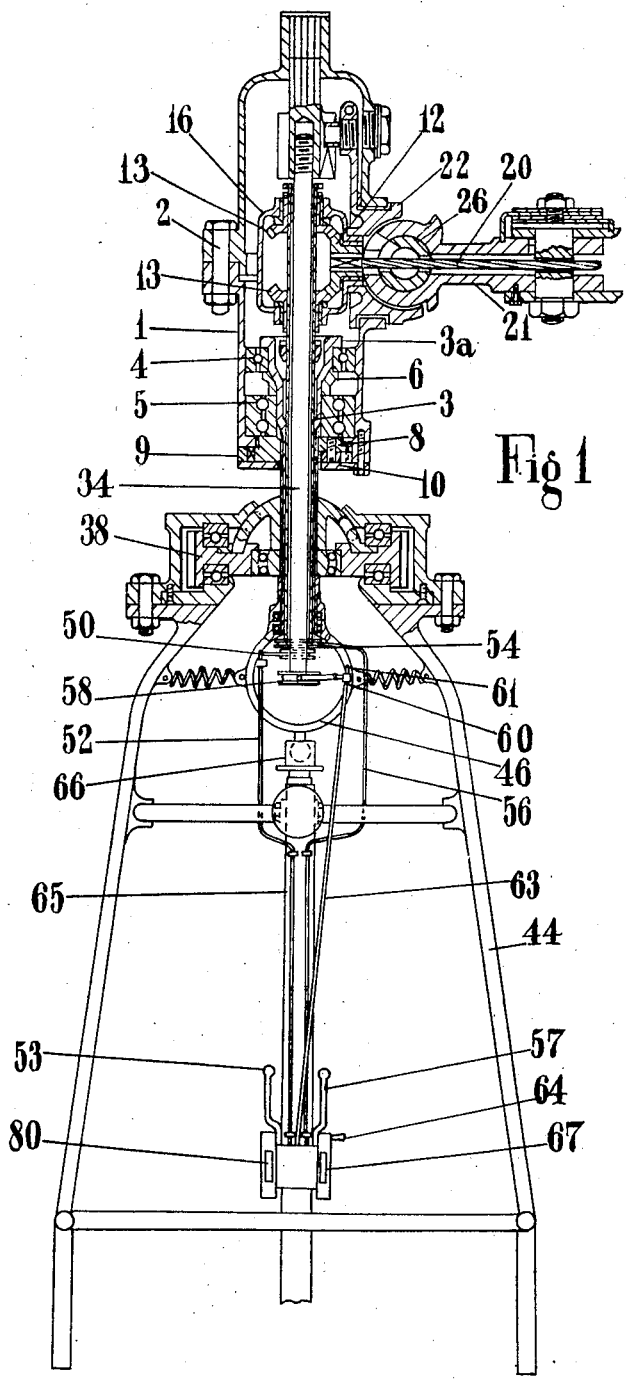
Figure 1 is a sectional elevation of a rotor head together with the means driving the rotor head, means for controlling the extension and retraction of the blades, and means for controlling the angle of incidence of the blades, all in accordance with the invention.
Figure 2:
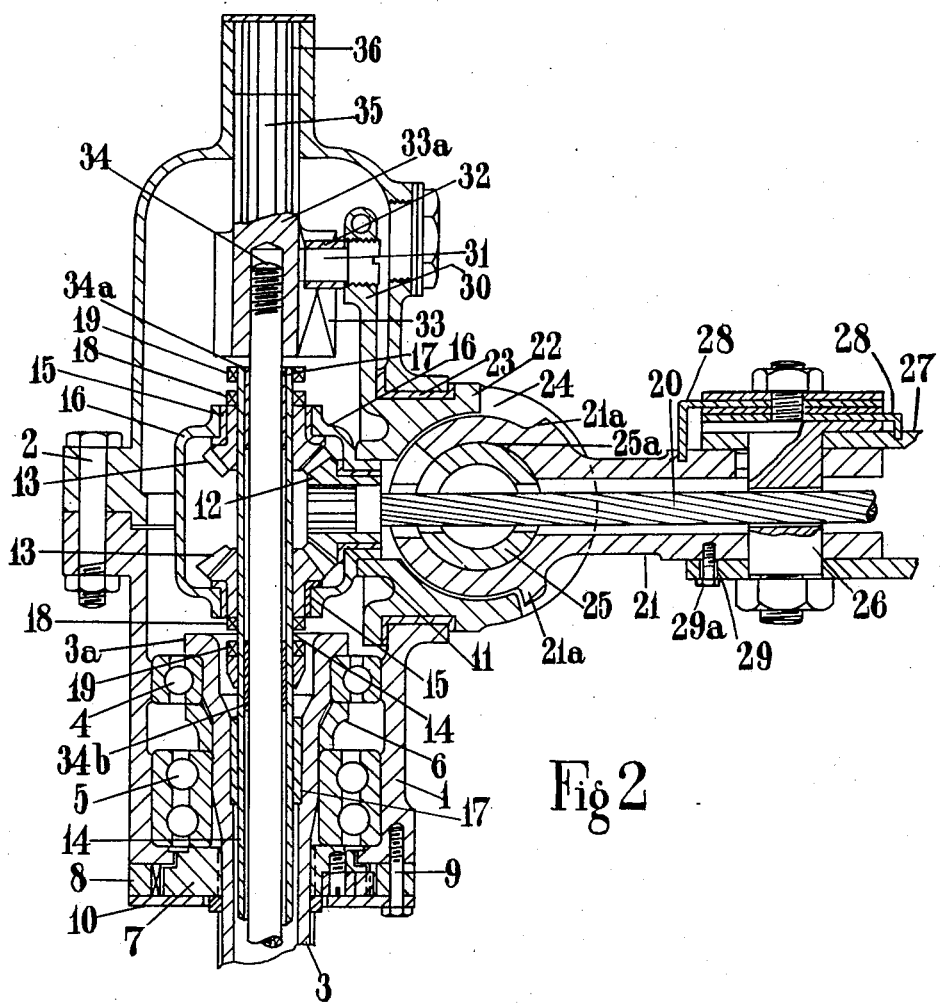
Figure 2 is a sectional elevation to a larger scale of the rotor head.

The rotor head comprises an outer body portion or casing 1 which, in the constructions shown in Figures 1 and 2, is conveniently formed of an upper and lower portion secured together by bolts 2. The driving shaft 3 is of tubular formation flanged as at 3ª and held centrally within the casing 1 by anti-friction bearings 4 and 5. A collar 6 interposed between said bearings holds them in spaced relationship. Said shaft has keyed thereon one member 7 of a one-way drive or clutch device, the other member 8 thereof being secured to the body portion 1 by means of bolts 9, which also serve to secure the lower cover plate 10 to the foot of the body portion. By such provision the shaft can rotate the rotor head in one direction, and the head is free to continue its rotation when the drive ceases.

Three bearings 11, only one of which is shown in Figures 1 and 2, are provided at right angles to the axis of the driving shaft and which form bearings for three bevel wheels 12, with each of which mesh two crown wheels 13. Said crown wheels normally are freely rotatable on a hollow spindle 14 and are carried by bearings 15 supported by a gear casing 16.

Spindle 14 is located within the driving shaft 3 and is capable of relative axial movement therein, a bearing bush 17 being provided between the shaft and spindle.

Each crown wheel 13 carries one member 18 of a dog clutch and the spindle 14 has secured thereto the co-operating members 19 of said clutches.

The boss or hub of each bevel wheel 12 is provided with a flexible connection 20, which extends radially outwards through a hinge member 21 to which a rotor blade support is secured as will be hereinafter set forth. Each flexible member carries a nipple on its inner end, said nipple having flats, and fits within a slot in the boss or hub of the corresponding bevel wheel 12 to form a driving connection therewith.

Each hinge member 21 is carried by a cylindrical member 22 rotatably mounted in bearings 23 in the body portion of the rotor head. Said cylindrical member is recessed to receive the disclike end of its hinge member 21 and is provided with two semi-circular lugs or webs 24. A hollow pin 25 extends through the cylindrical member 22 and its lugs and also through the hinge member 21, so that the latter is capable of a limited rotary movement, such movement being restricted by the stops 21ª, bearing on the cylindrical member. The pin 25 has a hole extending diametrically therethrough, through which hole passes the flexible connection 20. Further, said pin 25 is provided with a spline into which fits a key 25ª, so that when the pin is fitted the said hole must be in position to permit the flexible connection being inserted therethrough.

Each hinge member 21 carries a vertical pivot pin 26, which serves to secure the usual fork 27 to which a rotor blade support is secured. Said pin is likewise provided with a diametrically extending hole through which passes the flexible member 20, said pin being splined so that it will, when inserted in position, have the hole in the correct position to accommodate the flexible members. The usual damping devices 28 are provided to damp any rotary movement of the forks, and therefore the rotor blades, in a horizontal plane about said pivot pins. Each fork 27 is provided with an extension 27a, having an arcuate slot 29 through which passes a pin 29a screwed into the hinge member, and by this means such rotary movement is definitely restricted.

Each cylindrical member 22 is provided on the inner end thereof with an upwardly extending arm 30, which carries a screw pin 31 having an encircling sleeve 32, which fits within a slot 33 formed in a head 33a mounted on the upper end of a central hollow spindle 34, which passes centrally through the hollow spindle 14 and driving shaft 3, bearing bushes 34a and 34b holding the spindle 34 centrally while permitting of its rotative axial movement. Said head is provided with an upward extension 35 which passes into a corresponding extension 36 in the upper end of the rotor body, both of said extensions being splined, by which relative rotary movement is prevented.

Said slots 33 are not vertical but form part of spirals having a very large pitch, the purpose thereof being hereinafter made apparent.

Figure 3:
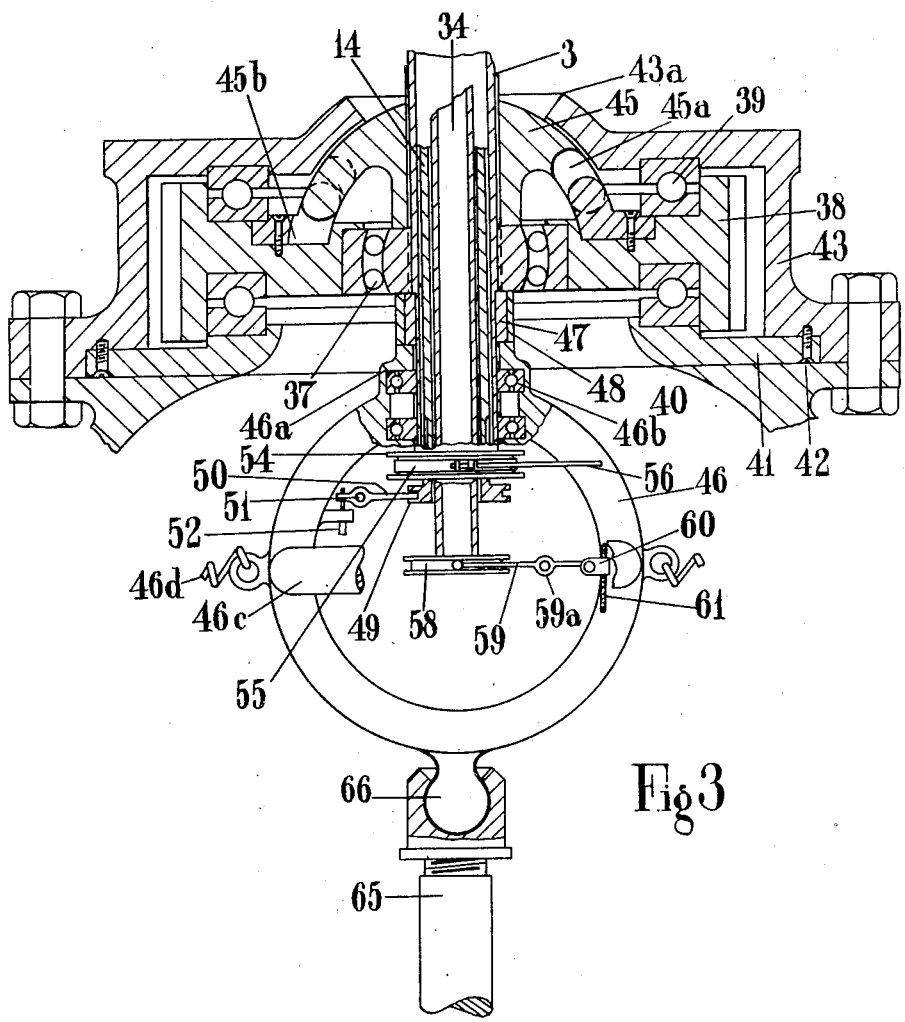
Figure 3 is a sectional elevation also to a larger scale of the means for driving the rotor head, the means controlling the extension and retraction of the blades and the means for controlling the angle of incidence of the blades.
Figure 4:
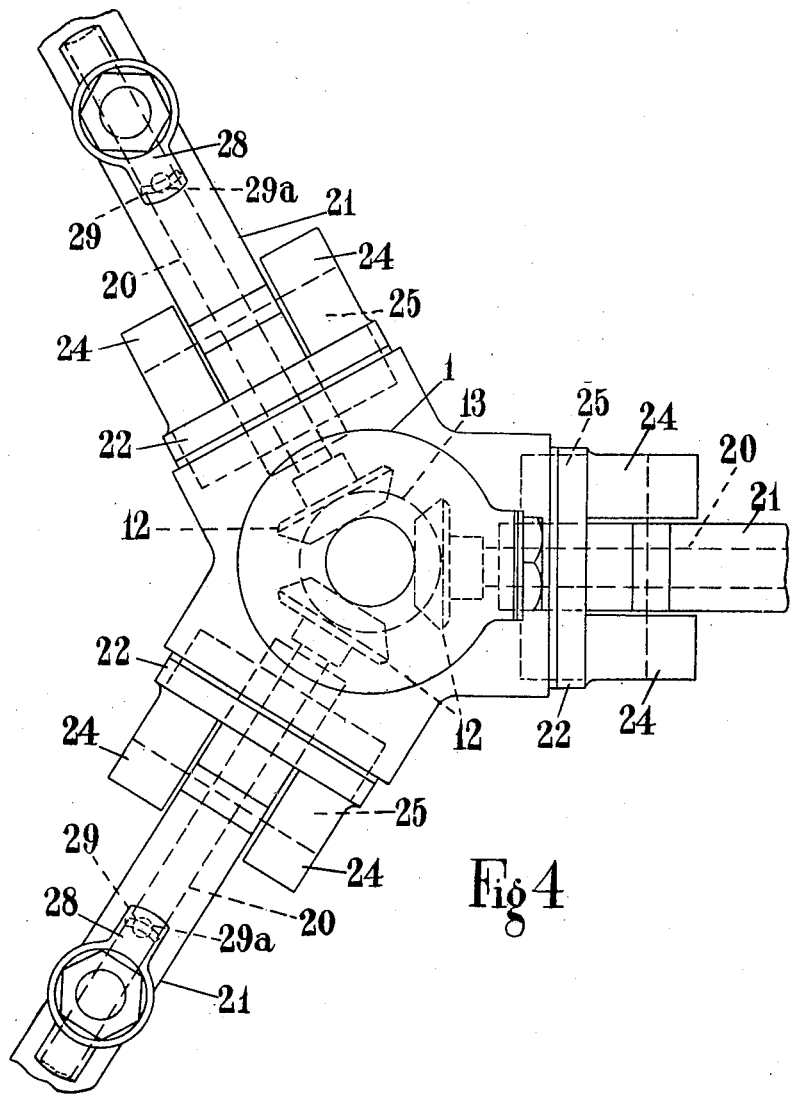
Figure 4 is a plan view of the rotor head.

Encircling the driving shaft is a self-aligning ball bearing 37, Figures 1 and 3, the opposed faces of the two races being of partial spherical formation, whereby universal movement of the shaft can take place about the outer race.

Secured to or carried by the outer race is a gear wheel 38, which runs between two anti-friction bearings 39 and 40. The lower of said bearings rests on an annular bottom plate 41 secured by screws 42 to a casing 43, the top of which receives the upper of said two bearings. If desired, the lower half of the ball bearing may be replaced by a plane bearing which will support the driving pulley or gear, since all the lifting thrust is upwards and comes upon the upper half of the bearing. Said casing is supported by a supporting structure 44, secured to the machine.

Said gear wheel is driven by an intermeshing pinion driven by any suitable means, the casing having a suitable aperture to accommodate said pinion. The drive is taken from the propeller engine through any suitable means. In lieu of a gear wheel a pulley or sprocket wheel may be secured to or supported by the outer race and the drive transmitted thereto by means of a belt or chain drive respectively.

Mounted on the shaft 3 so as to rotate therewith is a semi-spherical member 45 having a series of fingers 45a, which engage with an annular series of fingers or ribs 45b secured to rotate with the gear wheel 38. The boss of said semi-spherical member bears on the inner race of the ball bearings 37 and the cover of the casing 43 is of a partly spherical formation as at 43a to conform to and bear on said member 45.

Instead of the star-shaped members a friction clutch device having cone or spherical surfaces may be employed, one half of which is fixed to the shaft and the other half to the pulley whereby the drive may be imparted, and when a certain speed is attained the rotor head will rise and automatically cut off the drive. Similarly on the speed decreasing on landing, for instance, the drive will be automatically engaged again and thus maintain a sufficient speed for keeping the blades practically horizontal for retracting purposes.

Mechanical means may be employed, if desired, to connect the drive to the rotor head, as and when required, independently of the lift or speed of the blades.

Located below the casing is a ring 46 having a boss 46a, through which extends the driving shaft 14 and the spindles 14 and 34. Two anti-friction bearings 46b are located within the boss and support the shaft 3 centrally therein. Said ring is provided on each side thereof with a horizontal semi-circular member 46c, and springs 46d, secured to the supporting structure 44 and to the ring and semi-circular members, retain the ring centrally while permitting it a limited vertical and universal movement.

The shaft 3 is of reduced diameter above said boss 46a and on the reduced portion is fitted a split collar 47 which is retained in position by an outer sleeve 48.

To the lower end of the hollow spindle 14 is secured a pulley 49, having an annular groove, and in said groove are fitted the two arms of a fork 50, which is fulcrumed at 51 to a bracket carried by said ring.

Said fork can be turned about its fulcrum by means of flexible or other power transmission means 52, which, in turn, is connected to a drum or other means operated by a hand-lever 53, see Figure 1. Also fast on said spindle above the said pulley is a brake drum 54 encircled by means of a brake band 55. This brake is operated by means of a flexible or other connection 56, which leads to a drum or other transmission device operated by a hand-lever 57.

A further grooved pulley 58 is secured to the lower end of the spindle 34 and the forked end of a lever 59 fits into said groove. This lever, which is pivoted at 59a to a bracket, not shown, carried by the ring 46, is provided with a nut 60 through which passes a screw 61, which is incapable of longitudinal movement and is connected by flexible or other means 63 to worm and screw or other reducing gear, not shown, operated by a handle 64.

The ring 44 is connected to a control column 65 by means of a ball and socket joint 66.

By the aforesaid construction it will be noted that the rotor head 1, together with the blades, and its driving shaft 3 can partake of a limited universal movement with respect to the supporting structure 44, that is, the rotor head can be tilted to any desirable angle, the self-aligning ball bearings permitting of such movement. Further, by means of the semi-spherical member 45 and the intermeshing fingers 45a and ribs or fingers 45b, such movement can take place without interfering with the drive transmitted to the shaft. That is, the pilot, by the operation of the control column 65, can tilt the rotor head as circumstances require and at the same time continue to drive the head, should he so desire.

When the head is being driven by the engine it will rise vertically, together with its shaft, relative to the supporting structure until the collar 47 bears on the inner race of the self-aligning bearing 37. The ring 46, hollow spindles 34 and 14, together with the pulley, will rise and fall in unison with the rotor head, the springs 46ᵃ permitting of this movement.

Should the pilot desire to alter the angle of incidence of the blades this is effected by turning the handle 64 which, through the flexible connection 63, rotates the screw 61. In consequence, the fork 59 is turned about its fulcrum, and the pulley 58, and therefore the inner spindle 34, raised up and down depending on the direction of rotation of the screw. The movement of this spindle is transmitted to the head 33ᵃ which, through the slots 33 therein and the pins 31 engaging therewith, rock the cylindrical members 22 about their horizontal axes. Such movement is transmitted through the pins 25 to the hinge members 21 by which the supports of the blades are carried. Thus, the angle of incidence of the blades may be altered as may be desired. The angle of incidence may be shown by an indicator 67.

To retract and extend the blades the lever 50 is rocked about its fulcrum by operating the hand lever 53. In consequence, the pulley 49 and therefore the hollow spindle 14 is raised or lowered, thus causing the lower or upper dog clutch members 18 and 19 respectively to engage. As a result thereof either the lower or upper crown wheel 13 is made fast to the hollow spindle 14. It is also necessary to operate the lever 57 by which the brake is applied to the drum 54 so that the spindle 14 is prevented from rotation. As the bevel wheels 12 are carried round by the rotor head and as one of the crown wheels 13 in mesh therewith is prevented from rotation, said bevel wheels 12 are rotated about their own axes and through the flexible connections 20 extend or retract the blades.

The rotor blades, which form the subject matter of my co-pending patent application of even date, are mounted on telescopic supports.

Each telescopic support, as shown in Figures 6, 7, and 8, consists of a screw threaded rod 69 on which is threaded a nut 70 to which is secured a tubular rod 71.

Secured to each forked member 27 is a sleeve 72 of oval cross section, which extends beyond the end of the rod 69. Telescoping over said sleeve is a second sleeve 73 of similar cross section and to this second sleeve the blade 74 is secured. The outer end of the tubular rod 71 is encircled by two helical springs 75 and 76, one of which bears on a rib 77 secured to the sleeve 73 and on a flange 78 on the extreme end of said rod 71, and the other spring 76 bears on the other side of said rib 77 and on a second flange 79 carried by said rod.

The inner end of the screw threaded rod 69 is provided with a transverse slot into which fits, so as to form a driving connection therewith, a transverse web formed on the end of a nipple 80 fast on the outer end of the flexible connection 20. Therefore, when bevel wheels 12 are driven they transmit their drive through the flexible connections to the screw threaded rods 69. The nuts 70 travel on the spindles and extend or retract the hollow rods 71 which, in turn, impart a corresponding movement to the outer sleeves 73 to which the rotor blades are attached. The outer sleeves travel along the inner sleeves which are pivotally connected by the forks 27 to corresponding hinge members 21. When the desired degree of extension or retraction is attained, which may be indicated on an indicator 80, the brake is released and the hollow spindle 14 moved into the neutral position indicated in the drawings by operating the hand lever 53, so that neither of the two crown wheels 13 are clutched to the hollow spindle 14.

Figure 5 indicates in full lines the blades in their extended position and in chain dotted lines the blades in their retracted position.

If desired, one or more collars 81, Figures 8, 10 and 11, may be secured to the exterior of the outer sleeve 73. Each collar is provided with one or more plungers, each loaded by a spring 83 and having their inner ends angled to chisel formation. The compression of the springs may be regulated by means of screws 84.

The inner sleeve 72 is provided with one or more apertures 85 corresponding to the plunger or plungers.

When the blades are extended to their full extent said plunger or plungers drops, or drop, into the aperture or apertures provided in the inner sleeve, so that the blades cannot be further extended. By reason of the chisel formation of the plunger or plungers the blades can be readily retracted.

Should any blade offer excessive resistance to its extension or retraction during any part of its rotation its hollow rod 71 can nevertheless move in unison with other rods 71, one or the other of the two springs 75 and 76 being then placed under compression, or further compression. When the resistance to the aforesaid movement becomes normal, which would occur as the blade continues on its rotary path, the said spring then operates to move the blade and sleeve relative to the hollow rod so as to occupy a position corresponding to that of the other blades.

If desired, the bevel gear wheels and the inner spindle may be omitted if it is not desired to employ the telescopic blades fitted to the rotor head.

The rotor head may be spherical and fairings or covers are secured in between the webs or the like provided on the body so as to create the smooth spherical surface. A suitable cap or cover having the required curve may be placed upon the top of the body.

If desired, the rotor head may be secured so that it cannot partake of any vertical movement, and further, the rotor head may be fitted with two or more blades to suit requirements.

In the construction shown in Figure 12 the rotor head is of spherical formation stepped at 90 to receive a ball thrust bearing 91 on which rests the flange 3ᵃ of the driving shaft 3. As the step is formed integral with the rotor head and the flange integral with the driving shaft, it is impossible for the rotor head to fly off the shaft unless the flange is sheered or the metal head is fractured.

In this modification the two crown wheels 13 are nonrotatably mounted on their spindle 14 and normally they are both kept free from engagement with the bevel wheels 12, the rotation of which extends and retracts the rotor blades. To extend or retract the blades the spindle 34 is raised or lowered, as the case may be, so that the lower or upper crown wheel fast thereon meshes with the bevel wheels 12. When this occurs the rotation of the head results in the bevel wheels 12 being driven to extend or retract the blades.

In this construction a slightly modified arrangement to alter the angle of incidence of the blades is shown, such means comprising a sleeve 92 carried by a cross pin 93 on the upper end of the central spindle 34 and guided in a slotted cylindrical projection 94 on a cover plate 95 secured to the rotor head. Said sleeve has slots 96 corresponding to the slots 33 in which the pin 31 fits. When this sleeve is raised or lowered by the operation of the spindle 34 the cylindrical member 92 operates to alter the angle of incidence of the blades.

A further feature incorporated in this construction is the application of the brake device by which the rotor head is braked when it drops down to its lowest position. This brake device conveniently comprises a fixed conical brake-like member 97 secured to the casing 43 and a conical member 98 secured to the shaft 3. When the head is rotating the conical member 98 is raised clear of the fixed member 97, but when the head falls said members engage and thereby apply a braking action to the rotation of the head.

It will be understod that such braking device or any other construction of braking device, which will fulfill the same function, may be applied to the head shown in Figures 1 and 2.

It will be further understood that in the construction shown in Figures 1 and 2 the arrangement of vertically movable crown wheels above described can be incorporated therein.

If desired, the means for altering the angle of incidence of the blades and/or the means for extending and retracting the blades may be omitted.

The controls by which the angle of incidence and the extension and retraction of the blades are effected are shown diagrammatically, and it will be understood that various alternative means may be employed to effect the same object.

It is to be understood that various other modifications, arrangements of parts and constructions of details may be made from those described without departing from the scope of the invention.

What I claim is:

1. For aircraft of the type set forth, a hollow rotor head, blades carried by said head, a number of bevel wheels carried by and located within the head, through which bevel wheels the radial movement of the blades can be effected, a spindle extending downwardly through the head, two crown wheels carried by the spindle, means for supporting the head whereby it can partake of a limited tilting movement, a driving member carried in fixed bearing, a driven member through which the drive is transmitted from the driving member to the head, the driven member being capable of a limited universal tilting movement in conformity with the movement of the head and relative to the driving member, means by which said spindle can be moved longitudinally to bring either of the two crown wheels into mesh with the bevel wheels, and means for preventing the rotation of said spindle and crown wheels carried thereby.

2. For aircraft of the type set forth, a hollow rotor head, blades carried by said head, means for effecting the radial movement of the blades and means for controlling the angle of incidence of the blades, all located within the head, a support for said head which permits the head to partake of a universal tilting movement, a driving member carried in fixed bearings, a driven member through which the drive is transmitted from the driving member to the head, the driven member being capable of a limited universal movement in conformity with the movement of the head and relative to the driving member, and two concentric spindles extending downwardly through the head and driven members, which spindles are each capable of an independent longitudinal movement, the one spindle controlling the means for effecting the radial movement of the blades and the other spindle controlling the means for altering the angle of incidence of the blades.

3. For aircraft of the type set forth a rotor head, blades carried by said head, a support for said head which permits the head to partake of a universal tilting movement, an annular driving member mounted in fixed bearings, a semispherical driven member through which the drive is transmitted from the driving member to the head, two annular series of intermeshing curved fingers carried by driving and driven members respectively, the driven member being capable of a limited universal movement in conformity with the movement of the head and relative to the driving member, and means extending downwardly through the head by which the operative position of the blades can be controlled.

4. For aircraft of the type set forth, a hollow rotor head, blades carried by said head, means located within the head by which the blades can be moved radially, means also located within the head by which the angle of incidence of the blades can be controlled, a support for said head which permits the head to partake of a limited universal tilting movement, a driving member carried in fixed bearings, a driven member through which the drive is transmitted from the driving member to the head, the driven member being capable of a limited universal movement in conformity with the movement of the head and relative to the driving member and two concentric spindles extending downwardly through the head and driven member, one of said spindles controlling the radial movement of the blades and the other spindle controlling the angle of incidence of the blades.

5. For aircraft of the type set forth, a hollow rotor head, hinge members carried by said head, blades capable of a radial movement carried by said hinge members, bearing in the head for the hinge members, means located within the head for turning said bearings to alter the angle of incidence of the blades, means for supporting the head whereby it can partake of a limited tilting movement, a driving member carried in fixed bearings, a driven member through which the drive is transmitted from the driving member to the head, the driven member being capable of a limited universal tilting movement in conformity with the movement of the head and relative to the driving member, and two concentric spindles extending downwardly through the head, the longitudinal movement of one of said spindles turning the bearings to alter the angle of incidence of the blades and the longitudinal movement of the other spindle moving the blades radially.

6. For aircraft of the type set forth a rotor head, blades carried by said head, a support for said head which permits the head to partake of a universal tilting movement, an annular driving member mounted in fixed bearings, a semispherical driven member through which the drive is transmitted from the driving member to the head, two annular series of intermeshing curved fingers carried by driving and driven members respectively, the driven member being capable of a limited universal movement in conformity with the movement of the head and relative to the driving member, and two concentric spindles extending downwardly through the head and arranged to tilt in conformity with the movement of the head, one of said spindles controlling the radial movement of the blades and the other controlling their angle of incidence.

7. For aircraft of the type set forth, a rotor head, blades carried by said head, a hollow shaft carrying said head, a ball bearing supporting said shaft so that the shaft complete with head, can partake of a universal tilting movement, the outer race of said bearing being carried in a fixed bearing while the inner race is splined to the shaft to permit the shaft and head to partake of a relative vertical movement, a driving member carried in fixed bearings, a driven member through which the drive is transmitted from the driving member to the head, the driven member being capable of a limited universal movement in conformity with the movement of the head and relative to the driving member, and two concentric spindles extending downwardly through the head and arranged to tilt in conformity with the movement of the head, one of said spindles controlling the radial movement of the blades and the other controlling their angle of incidence.

8. For aircraft of the type set forth, a rotor head, blades carried by said head, a support for said head which permits the head to partake of a universal tilting movement, a driving member carried in fixed bearings, a driven member through which the drive is transmitted from the driving member to the head, the driven member being capable of a limited universal tilting movement in conformity with the movement of the head and relative to the driving member, two concentric spindles extending downwardly through the head and arranged to tilt in conformity with the movement of the head, one of said spindles controlling the radial movement of the blades and the other controlling their angle of incidence, and a control column located below and operatively connected to the head by means of a universal joint.

9. For aircraft of the type set forth, a rotor head, blades carried by said head, a hollow shaft carrying said head, means supporting said shaft so that it can partake of a universal tilting movement, a driving member, a support for said member, a driven member mounted on the shaft so that the latter can move axially therethrough, said driving and driven members forming a coupling which permits a limited universal tilting movement being imparted to the shaft and rotor head, both when being driven and when rotating freely, two concentric spindles extending downwardly through the head and arranged to tilt in conformity with the movement of the head, one of said spindles controlling the radial movement of the blades, and the other controlling their angle of incidence, and a control column located below the hollow shaft and operatively connected thereto by a universal joint.

10. For aircraft of the type set forth, a rotor head, an inwardly projecting step integral with said head, a hollow shaft carrying said head, an outwardly projecting flange integral with the upper end of the shaft, the step supporting the flange when the aircraft is in flight, means supporting said shaft whereby the shaft, complete with head, can partake of a limited universal tilting movement, a driving member carried in fixed bearings, a driven member secured to the shaft and by which the drive is transmitted from the driving member to the head, the said driven member being capable of a limited universal movement, while being driven, in conformity with the movement of the head and shaft and relative to the driving member and two concentric spindles extending downwardly through the head, one of said spindles controlling the radial movement of the blades and the other controlling their angle of incidence.

PETER CAMERON.